United States Patent
Ogunwumi et al.

(10) Patent No.: US 7,132,150 B2
(45) Date of Patent: Nov. 7, 2006

(54) POROUS CERAMIC FILTERS WITH CATALYST COATINGS

(75) Inventors: Steven B. Ogunwumi, Painted Post, NY (US); Odessa N. Petzold, Elmira, NY (US); Yuxin Tang, Horseheads, NY (US); Tinghong Tao, Big Flats, NY (US); Jianguo Wang, Horseheads, NY (US); Raja R. Wusirika, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 297 days.

(21) Appl. No.: 10/641,638

(22) Filed: Aug. 14, 2003

(65) Prior Publication Data

US 2005/0037147 A1     Feb. 17, 2005

(51) Int. Cl.
*B32B 3/12* (2006.01)
*B05D 7/22* (2006.01)
*B05D 3/02* (2006.01)

(52) U.S. Cl. .......... 428/117; 428/116; 428/155; 428/307.3; 428/315.5; 428/316.6; 427/226; 427/228; 427/230; 427/244; 427/393.6; 427/407.1; 427/419.2; 502/439

(58) Field of Classification Search .......... 427/243, 427/244, 230, 407.1, 419.2, 385.5, 226, 228, 427/393.1; 428/116, 117, 307.3, 315.5, 314.2, 428/316.6, 155
See application file for complete search history.

(56) References Cited

U.S. PATENT DOCUMENTS

| | | | |
|---|---|---|---|
| 4,451,517 A | | 5/1984 | Inoguchi et al. |
| 4,483,940 A | * | 11/1984 | Ono et al. .................. 502/159 |
| 4,532,228 A | * | 7/1985 | Golino et al. ............... 502/261 |
| 5,139,993 A | * | 8/1992 | Schmidt et al. ............. 502/325 |
| 5,346,722 A | | 9/1994 | Beauseigneur et al. |
| 5,429,779 A | * | 7/1995 | Locker et al. ............. 264/40.1 |
| 5,492,679 A | * | 2/1996 | Ament et al. ............... 422/180 |
| 5,866,016 A | | 2/1999 | Jaquess et al. |
| 6,541,407 B1 | | 4/2003 | Beall et al. |
| 2003/0027718 A1 | * | 2/2003 | Nordquist et al. .......... 502/159 |

* cited by examiner

*Primary Examiner*—Kirsten Jolley
(74) *Attorney, Agent, or Firm*—Kees van der Sterre

(57) ABSTRACT

Porous ceramic catalyst supports or filters to be provided with catalyst coatings via oxide washcoating processes are pre-coated with polymer barrier layers to prevent washcoat nanoparticle intrusion into the microcracked and/or microporous surfaces of the ceramics, the barrier coatings being formed of hydrocarbon polymers that are soluble or dispersible in polar media, capable of forming neutral or hydrophilic surfaces on porous ceramic supports, and completely vaporizable at moderate washcoat stabilization or catalyst activation temperatures.

7 Claims, 2 Drawing Sheets

POROUS CERAMIC FILTERS WITH CATALYST COATINGS

BACKGROUND OF THE INVENTION

The present invention relates to processes for applying catalyst or catalyst support coatings onto ceramic supports. More particularly, the invention relates to methods for coating ceramic substrates with catalyst coatings wherein a pre-coating or passivation step is used to improve the properties of the catalyzed substrates, by reducing catalyst and/or support coating diffusion into the fine pore and microcrack structure the substrates.

To address tightening diesel engine emissions regulations being adopted in the United States and Europe, recent attention has focused on basic improvements in the design and performance of ceramic wall-flow honeycomb filters for treating diesel exhaust gases. Among other improvements, design changes allowing for the use of catalyst coatings to control hydrocarbon and/or nitrogen oxide emissions are being implemented. The goal is to develop an improved high-temperature-resistant, high-thermal-shock-resistant, low cost honeycomb soot filter compatible with advanced emissions control catalyst technologies that can replace current high-cost and/or uncatalyzed particulate filters.

Among the filter designs being developed for this application are refractory ceramic oxide filters offering improved resistance to high exhaust temperatures encountered during decarbonizing filter regeneration cycles, as well as to the thermal shock conditions arising during rapid filter heat-up and cool-down in the course of startup and regeneration. Examples of advanced cordierite and aluminum titanate compositions and honeycomb filter designs being developed for these applications are disclosed in U.S. Pat. No. 6,541,407 and in co-pending, commonly assigned U.S. patent applications Ser. No. 60/400,248 filed Jul. 31, 2002, 10/209,684 filed Jul. 31, 2002, and Ser. No. 10/098,711 filed Mar. 14, 2002. Among other materials that are candidates for refractory, catalyst-compatible ceramic particulate filters are the refractory alkali zirconium phosphates as well as low-expansion alkali aluminosilicates such as beta-eucryptite and pollucite. Many of these same compositions, and other microcracked ceramic materials such as the calcium aluminates, are being considered for use as flow-through catalyst supports for the control of nitrogen oxide (NOx) emissions from automotive and diesel engines Advanced aluminum titanate ceramics are among the most promising candidates for use in diesel exhaust filter applications, meeting or exceeding most specifications for high melting point, high thermal capacity, and low thermal expansion. However, one difficulty with these and other porous ceramics intended to function as particulate filters is the need to maintain both high gas permeability and a low coefficient of thermal expansion throughout the processes involved in depositing catalysts on the filter walls. A general requirement is that a low average linear coefficient of thermal expansion (CTE) for these filters should be maintained. Desirably, Increases in CTE resulting from the application of washcoats and catalyst should not exceed $10 \times 10^{-7}/°$ C. averaged over the range from 25–1000° C., and CTE values for the washcoated filters should not exceed $20 \times 10^{-7}/°$ C. over that temperature range, in order to preserve the thermal shock resistance of the filter. Further, gas permeabilities through the catalyzed filter should be sufficient to maintain pressure drops below 8 kPa at exhaust gas space velocities up to 150,000 $hr^{-1}$ after filter regeneration to remove trapped particulates.

Problematically, significant increases in CTE and reductions in filter permeability frequently result from the application to these filters of the alumina or other washcoating materials customarily employed to support the required emissions control catalysts. Present understanding is that during the washcoating or catalyzing process, both wall porosity of the filter and the structural micro-cracks (crack widths of 0.1–3 microns) that are present in most of these ceramic materials are frequently filled with the washcoating material. The problem is most severe in the case of highly microcracked ceramics such as the aluminum titanates, particularly when the washcoating formulations contain materials of very fine particle size (e.g., particle diameters in the 0.02–0.1 µm range).

Microcracking is a significant contributor to the low CTEs exhibited by many of these materials, with crack closure during heating considerably moderating the dimensional increases that would otherwise occur. Thus the filling of these microcracks with washcoating constituents can result in some cases in much higher expansion coefficients, e.g., in the range of $40-50 \times 10^{-7}/°$ C., in the washcoated structures. At these CTE levels the risk of structural damage to the filters under the normal conditions of exhaust filter use is unacceptable.

One approach to the problem of washcoat microcrack filling that has been employed during the catalyzation of conventional flow-through catalyst substrates for gasoline engine emissions control has been the use of so-called passivating coatings. These are pre-coatings applied to the walls of the ceramic substrates prior to washcoating that can block the washcoating materials from intruding into the microcrack structure of the ceramic. U.S. Pat. No. 4,532,228 provides some examples of coating materials that can be carbonized or otherwise solidified to provide a washcoat barrier, and then removed after the washcoat has been laid down.

Unfortunately, these conventional coating approaches have so far not been effective to provide suitable passivating coatings for ceramic wall flow filters or advanced flow-through catalyst supports. One recurrent problem is that the known passivating coatings do not provide adequate protection against CTE increases in highly microcracked ceramics such as the aluminum titanates. Another problem is that such coatings are not very effective to guard against unacceptable reductions in ceramic wall gas permeability. The high gas permeability provided by the highly interconnecting wall porosity of advanced ceramic wall flow filters is of critical importance for engine exhaust filtration applications. Thus some means of simultaneously preserving the low thermal expansion coefficients and high gas permeability of advanced ceramic support or filter materials such as the aluminum titanates, even at high catalyst washcoat loadings, is required. Further the means selected cannot adversely affect the important catalyst support functions of the washcoat.

SUMMARY OF THE INVENTION

The present invention provides improved passivating coating systems offering particular advantages for the passivation of high porosity, highly microcracked ceramic honeycomb filters. These passivating coating systems are based on families of polymer coatings that effectively cover or pre-fill microcracks and micropores during the washcoating process, while at the same time protecting the gas permeability of the high porosity ceramic walls of the filters. The preferred systems can also improve the washcoating characteristics of the substrate to enable high washcoat and catalyst loadings to be applied. Finally, these systems are sufficiently durable to maintain an effective barrier function throughout the various steps of the washcoating process, yet are readily removable by heating after washcoating without damaging disruption of the overlying ceramic material coatings, or any loss of washcoat bonding or adhesion to ceramic filter body.

In one important aspect, then, the invention includes a method for protecting a porous ceramic substrate having a microporous or microcracked structure from microstructural infiltration by microparticles present in a coating medium which comprises the step of applying to the substrate a "passivating" polymer barrier layer composed of a hydrocarbon polymer with hydrophilic and hydrophobic functional groups that is both soluble or dispersible in a polar medium and that forms a neutral or hydrophilic surface on the substrate, at least in the presence of acidic washcoating media. Examples of specific polymer types with these characteristics, from which the hydrocarbon polymer for the barrier layer may be selected, include ionene polymers, acid-activated aminoacrylate copolymers, and aliphatic acrylic acid copolymers.

In another aspect the invention includes an improved method for washcoating a porous ceramic substrate with a layer of a selected ceramic material. That method includes the steps applying to the substrate a "passivating" polymer barrier layer composed of a hydrocarbon polymer as above described to provide a polymer-coated ceramic substrate, and thereafter over-coating the polymer-coated substrate with an aqueous dispersion of the selected ceramic washcoating material to provide a ceramic-coated substrate. Thereafter, the ceramic-coated substrate is heated to remove the polymer precoating and, generally, to dry and bond the ceramic washcoat material to the substrate.

The preferred polymeric ionenes, acrylic acid copolymers, and acid-activated aminoacrylate copolymers forming these barrier coatings may generally be characterized as water-soluble or water-dispersible polymers that combine hydrophilic and hydrophobic behavior in the acidic environment typical of aqueous washcoating media. Coatings of these polymers not only provide durable barriers against microparticulate intrusion into microporous ceramic substrates, but also form surfaces of neutral or hydrophilic character in the presence of typical washcoating preparations, surfaces that can in some cases improve coating efficiency during the washcoating stage of the process. And finally, the polymers can be entirely removed from the interconnecting microchannel structure after washcoating by thermal decomposition at only modest temperatures, and without disruption of the overlying washcoat.

Without intending to be bound by theory, it is presently thought that these polymer coatings partially preoccupy and block, by capillary force, both the crack structure of microcracked ceramic substrates and the interconnecting microchannel (interconnected microporous) wall structure of ceramic substrates being developed for advanced wall flow particulate filters. The latter will thus demonstrate, after washcoating, the combination of efficient particulate filtration and high gas permeability necessary for effective performance as engine exhaust filtration devices. Further, as polymer is removed in the course of washcoat drying and/or catalyst activation, porosity previously not accessible to catalyst washcoat particles could become available and thus contribute to the improvement of the overall permeability and catalytic activity. In any case these polymer coatings leave open a sufficient volume of large pores that effective deposition of the active catalysts needed for highly active catalyzed particulate exhaust filters can routinely be achieved.

A commercially important intermediate product provided by the invention for use in a wide variety of washcoating processes is a polymer-coated ceramic honeycomb useful for manufacturing a wall flow filter body. This intermediate comprises a microporous or microcracked ceramic substrate supporting a hydrocarbon polymer barrier coating with a neutral or hydrophilic surface characteristic such as above described. A preferred substrate is one wherein aluminum titanate constitutes the principal crystalline phase, i.e., a crystalline phase making up more than 50% by weight of the structure. Such intermediate products can be used to provide end products including catalyzed wall flow exhaust filters of high permeability and low thermal expansion coefficient. A specific example of a filter of this type is a catalyzed aluminum titanate honeycomb ceramic wall flow filter supporting a catalyst-bearing alumina washcoat, wherein the catalyzed filter exhibits an average linear coefficient of thermal expansion (25–1000° C.) not exceeding about $20 \times 10^{-7}/°$ C., and a gas permeability providing an unloaded (soot-free) filter pressure drop not exceeding 8 kPa at an exhaust gas space velocity of 150,000 $hr^{-1}$. That filter will have a washcoated pressure drop not exceeding twice the pressure drop of the filter absent the catalyst-bearing alumina washcoat, and an average CTE increase of not more than $10 \times 10^{-7}/°$ C. over the CTE of the non-washcoated filter.

DESCRIPTION OF THE DRAWINGS

The invention is hereinafter more fully described with reference to the appended drawings, wherein.

DETAILED DESCRIPTION

The use of catalysts in combination with ceramic exhaust particulate filters for engine exhaust emissions control presents special catalyst coating concerns. This is because the interconnecting wall porosity of the ceramic filter must survive the catalyst coating process in order to preserve the exhaust gas pressure drop requirements of the exhaust system.

Figure 1:
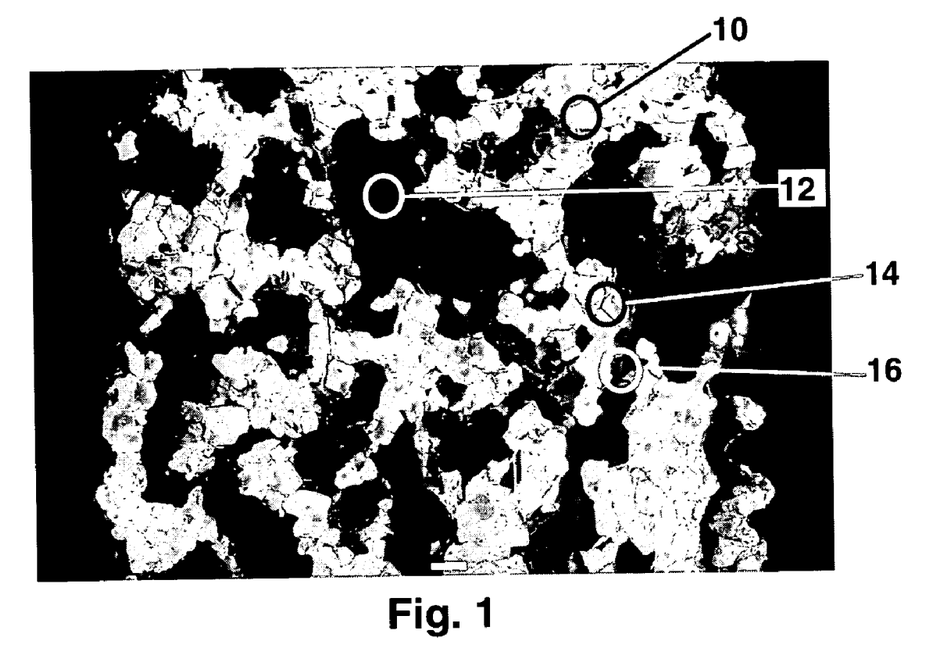
FIG. 1 is an electron photomicrograph of a cross-section of a porous ceramic material treated in accordance with the invention.

An example of the pore structure within the walls of a porous ceramic honeycomb of aluminum titanate composition is illustrated in FIG. 1 of the drawing, which is a scanning electron photomicrograph of a cross-section of a typical wall wherein the white bar represents a dimension of 20 μm. A typical aluminum titanate crystalline domain within that wall is indicated at 10, and a typical large pore opening within which active catalyst may reside is indicated at 12. In this particular ceramic, crystalline aluminum titanate occupies about 60% by volume of the ceramic while the volumes of the larger pores make up the remaining 40% of the volume of the material.

Smaller features in FIG. 1 include microcracks such as cracks 14 formed between aluminum titanate crystalline domains in the ceramic and microchannels such as channel 16 interconnecting the larger pore spaces within the ceramic. The latter typically have diameters in the 1–10 micron range and thus are easily filled by washcoat particulates. This microcracked, microchanneled crystalline structure is characteristic of ceramic honeycombs comprising aluminum titanate as the predominant crystalline phase, as well as other ceramics designed to exhibit permeabilities appropriate for use as wall flow filter materials.

The micropores and microcracks in FIG. 1 represent the regions of the material into which washcoat penetration is to be avoided. In cases where a catalyst washcoat is applied directly to ceramic walls featuring microcrack and micropore morphologies such as shown in FIG. 1, large increases in both thermal expansion and filter pressure drop are exhibited by the washcoated filters, due to washcoat penetration into these microstructural features.

The compatibility of conventional organic passivating coatings with alumina-containing solutions or slurries that are generally acidic in nature is not particularly good. Typical alumina washcoating formulations are gel solutions comprising alumina or alumina precursors of 2–5 micrometer average particle size in acidic aqueous media of pH 3–4. Some of the known compositions used for microcrack barrier coatings consist of hydrophobic, covalently bonded, straight-$CH_2$-chain polymers that do not easily form homogeneous passivation layers on hydrophilic ceramic surfaces. Further, these polymers typically do not exhibit hydrophilic surfaces as deposited.

While simple hydrophilicity or water solubility of a polymer can be advantageous from an ease-of-processing standpoint, this property is clearly not sufficient to insure an effective barrier coating system for protecting microcracked ceramics. Water-soluble coatings have a natural tendency to re-dissolve when exposed to washcoating solutions, exposing the microcracks and microchannels in the ceramic to washcoating penetration during deposition or, especially, during the washcoat drying process. The hydrophobic groups present in most polymers tend to surface-segregate on drying, making the resulting films more hydrophobic than desired and thereby reducing the extent of washcoating pickup achievable from water-based washcoating suspensions.

The so-called ionene polymers constitute a family of high-charge-density linear polymers that avoid both excessive hydrophobicity and high solubility in aqueous washcoating media. These polymers are characterized by the presence of dimethylammonium charge centers interconnected by alternating alkyl chain segments containing x and y methylene groups. The preferred ionene polymers are water soluble linear polymers incorporating regular quaternary ammonium groups associated with chloride counterions that impart high charge density to the polymer chain, beneficially affecting both polymer/substrate and polymer/washcoat interactions during passivation and washcoating. The applied polymer coatings are thought to interact with alumina-containing sol-gel washcoating media in a manner that promotes the agglomeration of nano-washcoat particles within the pores of the ceramic. If present, such agglomeration would likely increase average washcoat particle size and thereby reduce alumina diffusion into microcracks and microchannels in the ceramic.

An specific example of an ionene polymer illustrating the charged nature of these polymers is poly[(dimethylimino) (2-hydroxy-1,3-propanediyl) chloride], CRN 39660-17-8. Examples of other ionene polymers include poly[(dimethylimino)decamethylene bromide] and poly(oxytetramethylene) ionene.

The structure of the propanediyl polymer is shown below:

The water solubility and high sol-gel activity of this polymer are attributable to the high density of positive quaternary ammonium groups and charge-balancing chloride counter ions in the polymer chains. Ionenes are most commonly used in waste water treatment applications, although they have also found use as dispersing agents or other additives to modify ceramic or other inorganic dispersions. The propanediyl polymers are commercially sold in several molecular weights ranging from 10,000 to 170,000, but other molecular weights can be used.

Particularly for ceramic filter applications, the complete removal of any barrier layer materials following washcoat application is important. Thermal decomposition of ionene polymer barrier coatings can commence at temperatures of 200° C. or less, and can proceed to substantially complete removal at temperatures as low as 450° C. Residual carbon levels are very low. Accordingly, average linear coefficients of thermal expansion in the range of $5-15 \times 10^{-7}/°$ C. (25–1000° C.) can readily be maintained in the washcoated and catalyzed ceramic substrates, while pressure drops for the catalyzed filters can be kept below twice (2x) the pressure drops of the uncoated filters.

Decomposition occurs largely by depolymerization and subsequent vaporization, proceeding at temperatures close to those at which final gamma-alumina phases develop from conventional washcoating materials. The resulting gas evolution may favor an enhancement in the porosity in alumina washcoat and final catalyst coating, an enhancement that could both improve catalytic activity and preserve low filter pressure drop. Further, polymer removal to substantial completion is thought to allow for the subsequent direct covalent bonding of washcoat constituents to the ceramic substrate with minimal blocking of the ceramic micropore structure.

Ionene polymer barrier layers sufficient to adequately protect ceramic honeycomb articles from adverse washcoating effects can normally be provided in a single polymer solution application and drying cycle. Depending on solution viscosity, solution impregnation under vacuum may be useful to promote saturation of the ceramic material. Simple air drying is adequate to set the polymer coating in preparation for washcoating, or the deposition of additional polymer layers if required. Subsequent washcoat application can proceed normally after drying of the barrier coating layer(s) without any special measures to accommodate the barrier coating.

A second class of polymeric compounds exhibiting both excellent compatibility with conventional washcoating slurries and a high degree of protection from the washcoat microcrack and micropore penetrations that cause increased substrate CTE are the acid-activated aminoacrylate copolymers present in certain water-based acrylic copolymer emulsions. The acid-activated copolymers present in such emulsions comprise a (meth)acrylic backbone incorporating both hydrophobic and hydrophilic components, and also an amino group that responds effectively to the changes in pH that occur during the application of typical washcoats.

Examples of suitable aminoacrylate copolymers of this type for inclusion in such emulsions include those having the following general structure:

wherein the molar ratio of amino methacrylate groups (a) to acrylate groups (b) is in a range of about 45–50:50, and wherein R is selected from hydrogen, amphiphatic, and hydrophobic hydrocarbon groups and constitutes from 1–5 mole percent of the polymer.

Acid-activated copolymers of this type are most conveniently applied to microcracked ceramic substrates from their aqueous polymer emulsions by vacuum infiltration, followed by vacuum removal of the excess emulsion and drying. The polymer loadings needed to provide effective passivation can be adjusted by dilution, and the viscosity of the coating by dilution and/or by slight adjustments in emulsion pH.

On exposure to acidic washcoat or washcoat/catalyst slurries the dried polymeric pre-coats are activated via the protonation of the tertiary amino groups. Activation results in (i) hydration of the polymer coating increasing the wettability of the surface via the transformation of essentially hydrophobic groups to hydrophilic moieties, (ii) conversion of the tertiary amino group to a quaternary amino group generating a positive charge which increases surface attraction for the washcoat/catalyst, and (iii) an increase in the volume of washcoat material adhering to the surface of the passivation coating. The latter effect is presently attributed to hydrophobe/hydrophobe and hydrophile/water associations occurring through secondary polymer-washcoat interactions, thereby trapping the washcoat/catalyst material on the substrate while protecting the microcracks. This 'swelling-like' action together with the presence of hydrophobic components in the passivating layer result in a barrier and are therefore responsible for the effectiveness of these coatings in protecting and preserving the microstructure of the ceramic substrates from washcoat/catalyst infiltration, thereby maintaining low CTEs in the substrates.

Yet a third barrier coating system offering many of the benefits of the ionene and acrylate copolymer systems is based on the aliphatic acrylic acid copolymers, and is typified by the ethylene acrylic acid wax copolymers. These polymers are also of mixed hydrophilic-hydrophobic character, and available in a range of molecular weights. The typical polymer structure is as follows:

These polymers are sold commercially as aqueous wax dispersions, and can conveniently be directly applied to porous ceramic substrates to provide barrier layers effective to limit washcoat microcrack penetration. The coating weights required for effective microcrack protection are similar to those useful for ionenes and aminoacrylate copolymers, and can be achieved in a single coating step. Vacuum impregnation is preferred but not required, since viscosities suitable for ambient dip-coating can easily be achieved by dilution. Recoating between drying steps is effective, enabling the use of multiple polymer layers wherein desired.

An important characteristic of all of three types of polymer barrier coatings above described is that that they can effectively limit the reductions in exhaust gas permeability necessarily arising from the application of washcoating layers to micorporous ceramic wall flow filters. At least some blockage of wall pore structure is unavoidable, but the resulting increases in backpressure, if moderate, can be considered an acceptable tradeoff for the catalytic activity imparted through washcoating and catalyzation processes. Generally, barrier coatings of the above-described polymeric materials produce no increase, and typically a decrease, in washcoated filter pressure drops when compared with washcoated filters produced with no polymer passivation treatment. Further, the washcoated filters of the invention are capable of maintaining washcoated filter pressure drops below 2.5 times those of equivalent washcoat-free filters over the entire expected range of filter operating conditions, a level considered generally acceptable for most catalyzed wall flow filter applications.

As suggested above, a further and unexpected processing advantage of the preferred types of barrier coatings above described is that they can act as adhesion or pickup promoters for conventional alumina and alumina-catalyst washcoating formulations. That is, the loadings of aqueous washcoating material picked up by the barrier-coated ceramics can be greater than are picked up by the uncoated ceramics under similar washcoating conditions, and substantially greater than ceramics barrier coated using prior art hydrophobic polymer coating preparations. Thus, in all cases, single-immersion washcoat loadings in the range of at least 30 grams and more typically 50–70 grams of washcoat per liter of filter volume can easily be achieved for a variety of ceramic honeycomb substrate geometries provided with polymer barrier coatings of mixed hydrophilic/hydrophobic character in accordance with the invention.

The invention is further described with reference to the following examples, which are intended to be illustrative rather than limiting.

EXAMPLE 1

Ionene Polymer Barrier Coating

Aqueous dispersions of Ionene polymers are commercially available, one source being the GE Betz specialty chemical company of Trevose, Pa., USA. The commercial KlarAid™ PC product line from that company comprises aqueous dispersions of water-dispersible propanediyl polymers, sold for use as organic coagulants in a range of molecular weights from below 10,000 to above 170,000. These are supplied as aqueous preparations containing 40–50% polymer solids that can be water-diluted to achieve solids contents in the 1–50% range as needed to modify suspension viscosity and control barrier coating thicknesses on porous ceramic substrates. A specific example is PC 1194 coagulant, a dispersion of the polymer poly[(dimethylimino)(2-hydroxy-1,3-propanediyl) chloride] with a molecular weight of 70,000 and a pH value of 6.1.

To provide washcoated filter samples using this polymer, a number of ceramic filter samples composed of a porous strontium feldspar (SrO.Al2O3.2SiO2) aluminum titanate ceramic are selected for coating. Each sample consists of a cylindrical ceramic honeycomb about 2 inches in diameter and 6 inches in length with alternately plugged channels running axially of the cylinder at a cell density of 200 square channels per square inch of honeycomb cross-section. The aluminum titanate ceramic material forming these filters has a fully consolidated density of about 3.5 g/cm$^3$, the porous walls of the honeycomb having a thickness of about 0.4 mm and a porosity of about 40% by volume.

To provide samples with polymer barrier coatings, each of the selected honeycombs is immersed in coating solution consisting of a water dispersion of the PC 1194 polymer at a selected solids concentration, and the solution with immersed honeycomb is placed in a vacuum chamber and subjected to a mild vacuum (0.9 atmospheres). The vacuum chamber is cycled two additional times from atmospheric to sub-atmospheric pressure to promote polymer penetration into the ceramic pore structure, and the samples are then removed from solution and blown clear of excess liquid with compressed air. Finally, the solution-treated honeycombs are air-dried at ambient for 15 minutes and then oven-dried at 100° C. for 3 hours. Each dried honeycomb is then weighed to determine the loading of polymer in the barrier coating.

Measurements of polymer coating weight are generally in agreement with the values that would be expected assuming complete filling of the pore structure of the aluminum titanate ceramic walls of the honeycomb filter samples with polymer solution. These measurements suggest good interaction between the ceramic pore surfaces and the polymer solution that promotes complete wetting of the ceramic by the liquid. The actual polymer loading in each case, which can vary depending on the concentration of the solution and/or the molecular weight of the polymer, can easily be controlled to a selected value within a loading range of about 2–10% of the weight of the coated filters.

Following the barrier coating of these honeycombs in accordance with the above described procedure, the coated samples are subjected to a conventional washcoating process utilizing a commercially available alumina-based washcoating solution. The washcoating solution employed Is Nyacol® AL20 colloidal alumina sol, commercially available from Nyacol Nano Technologies, Inc., Ashland, Mass., U.S.A. The washcoating process comprises dip-coating the barrier coated filters in the washcoating solution for 2 minutes to achieve an even coating layer, and then removing excess coating from the sample using compressed air.

Following the application of the washcoating solution the filters are air-dried at ambient temperatures for 15 minutes and then oven-dried in a programmable oven at 100° C. for 3 hours. The wash-coated filters are then further heated in the oven to a final hold temperature of 550° C. and held at that temperature for 3 hours to remove the polymer barrier material and set the alumina washcoats. Finally, the heated samples are removed from the oven, weighed to determine the amount of washcoat deposited on each sample, and evaluated for thermal expansion changes and pressure drop performance.

Washcoat pickups for untreated ceramic filters of this geometry and pore morphology normally do not exceed 50 grams of alumina per liter of filter volume, after final heating. In contrast, filters provided with polymer barrier coatings as above described can reach washcoat loadings as high as 60–65 grams of alumina per liter of honeycomb volume. The actual pickup will depend on variables such as the polymer loading and the molecular weight of polymer present on the barrier-coated honeycombs.

The effect of enhanced washcoat pickup for the particular samples employing this particular barrier coating occurs for honeycombs provided with about 2–10% of polymer barrier coating by weight, optimally 3–4% of polymer coating by weight. Higher or lower polymer loadings yield only conventional or reduced washcoat weights. The observed washcoat pickup enhancement is presently attributed to an agglomerating effect exerted by the polymer coating on the washcoating solution that acts to increase washcoat viscosity and thereby support higher washcoat thicknesses. The effect appears greater for higher molecular weight ionenes at equivalent barrier coating weights.

Figure 2:
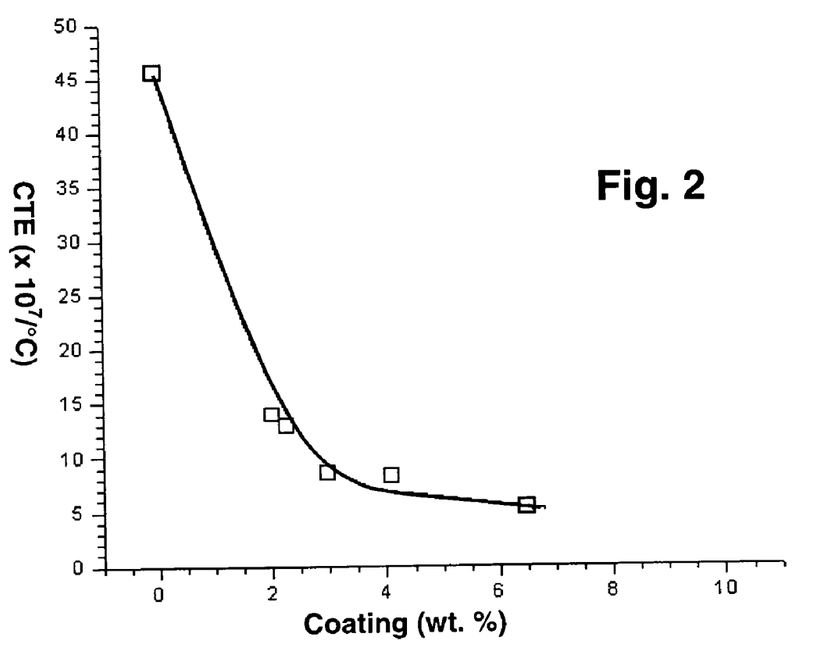
FIG. 2. is a graph plotting thermal expansion coefficient against barrier coating thickness for a washcoated ceramic article provided in accordance with the invention.

The effectiveness of ionene polymer barrier coatings in controlling the thermal expansion increases resulting from the application of conventional alumina washcoats to these filter samples is illustrated in FIG. 2 of the drawings. FIG. 2 plots representative average linear coefficient of thermal expansion (CTE) data for a series of washcoated honeycomb filter samples produced as above described. The CTE values are plotted as a function of the weight of polymer barrier coating applied to the samples prior to washcoating.

As suggested by the thermal expansion data presented in FIG. 2, where no polymer barrier coating is provided (coating weight of 0%), aluminum titanate filters of the geometry and composition provided in accordance with this example exhibit average expansion coefficients above $45 \times 10^{-7}/°$ C. following washcoating. This represents a more than 8× increase over the expansion coefficient characteristic of these same filter samples prior to washcoating (approximately $5.4 \times 10^{-7}/°$ C.), and it produces an unacceptable reduction in the thermal shock resistance of the filters.

In contrast, the addition of polymer barrier coatings in accordance with this Example results in a sharp decrease in washcoated CTE values even at low to moderate barrier coating weights. Electron photomicrographic studies of washcoated sample fracture surfaces confirm significant reductions in the deposition of washcoat particles within the microcracks, Thus these coatings effectively enable average

CTE values to be maintained below the commercially acceptable level of about $15 \times 10^{-7}/°$ C. over the 25–1000° C. range if appropriate coating weights are provided.

Ionene polymer barrier coatings are also effective to prevent unacceptable increases in washcoated filter pressure drops under flow conditions characteristic of engine exhaust gas systems. Pressure drop tests are conducted on barrier-coated filters of the filter geometry reported in this example with alumina washcoat loadings of 55–60 g/liter in both a soot-loaded condition and after filter regeneration to reestablish zero trapped particulate. Over a barrier coating polymer molecular weight range from 10,000 to 170,000 and at barrier coating weights not exceeding 5%, washcoated filter pressure drops recorded at space velocities up to 144,460 $hr^{-1}$ do not exceed 2 times the washcoat-free pressure drops over the entire range of filter soot loadings from zero up to 4.5 g/liter. Again, these desirable performance characteristics are attributed to favorable dispersion of washcoating materials on and within the large pore structure of the ceramic substrate and the exclusion of the washcoat from the microchannel structure of the ceramic.

EXAMPLE 2

Aminomethacrylate-Acrylate Copolymer Barrier Coating

A specific type of acid-activated copolymer present in some commercial water-based acrylic copolymer emulsions is a hydrophobically modified aminomethacrylate-acrylate copolymer such as described above wherein the R groups are of the structural formula:

Co-polymers of this structure are commercially available in the form of water-based emulsions, a specific example of one commercial product being Alcogum L-520 alkali-soluble emulsion, sold by the Alco Chemical company of Chattanooga, Tenn., U.S.A. These formulations have pH values in the range of 8–9 and co-polymer solids contents within the range of 6–20%, and are capable of providing passivation layers ranging up to 12% by weight of complex ceramic shapes such as high-geometric-surface area ceramic honeycombs.

To test the effectiveness of one such preparation a passivating coating mixture based on Alcogum L-520 emulsion (received as a 20% solids by weight) is diluted to 10–15% solids by weight, if necessary 1–2% addition of isopropyl alcohol can be added with mixing for slight adjustments in viscosity.

The thus-prepared polymer coating preparation is applied to a number of ceramic filter samples consisting of porous strontium feldspar aluminum titanate ceramic honeycombs as described in Example 1 above. The filter samples consist of cylindrical ceramic honeycombs about 2 inches in diameter and 6 inches in length with alternately plugged channels running axially of the cylinder. The honeycombs have a cell density of about 200 square channels per $in^2$ of honeycomb cross-section, a channel wall thickness of about 0.4 mm, and a channel wall porosity of about 40% by volume, the porous aluminum titanate ceramic material forming the channel walls having a density of about 3.5 $g/cm^3$.

The polymer coating process comprises immersing the samples in the described coating solution followed by vacuum assisted impregnation. The samples are then removed from solution, blown clear of excess liquid with compressed air, and dried in air at 100° C. for 3 hours to a constant weight.

Following this passivation treatment, the polymer-coated samples are processed through a washcoating process to deposit alumina washcoats thereon. The washcoating procedure and formulation employed for this purpose is substantially that described in Example 1 above. Heat treatment of the washcoated samples to remove the barrier coating polymer and set the alumina washcoats is carried out by heating the coated samples to about 450° C. and maintaining that temperature for about an hour. Weighing of the thus-treated samples following this heat treatment indicates typical washcoat pickups of about 55 g/L of alumina.

The level of microcrack and micropore protection achieved through the use of these copolymer passivation coatings is again excellent. Typical washcoated samples provided in accordance with this Example have average CTE values in the range of about $7.5$–$15 \times 10^{-7}/°$ C. over the temperature range 25–1000° C., in contrast to coefficients of $45 \times 10^{-7}/°$ C. for washcoated filter samples produced with no polymer barrier coatings.

The high degree of CTE protection afforded by these copolymers is attributed to the high resistance of the polymer layers to removal by aqueous washcoating media. Although water-dispersed, these polymers are not water-soluble. Accordingly the barrier coatings resist removal even in the unactivated state, and when activated in acid washcoating media tend to cling to porous ceramic substrates. This clinging effect is attributed to the swelling behavior of the hydrophobic components of these polymers under aqueous acidic conditions.

Figure 3:
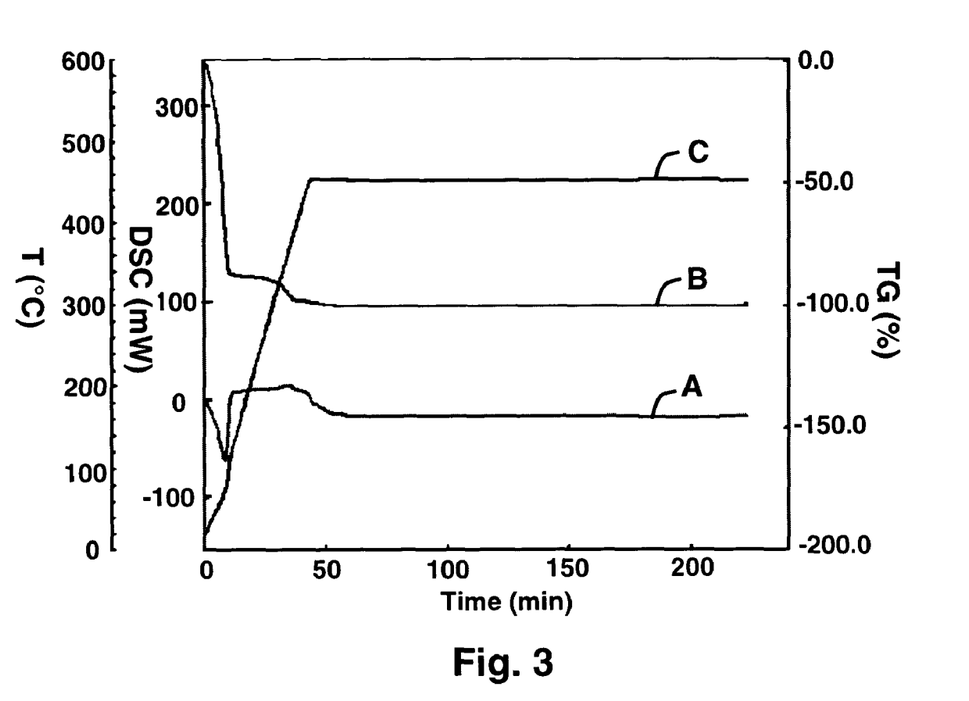
FIG. 3. plots temperature, calorimetric and weight loss data collected during the heating of a barrier-coated ceramic sample.

A further particular advantage of these acrylate copolymer barrier materials is that they commence rapid decomposition at temperatures in the range of 325° C., achieving clean burnout from porous ceramic substrates within 15 minutes of exposure to temperatures of 450° C. FIG. 3 of the drawings plots temperature, DSC, and TGA data generated during the heating to 450° C. of a typical barrier-coated ceramic sample provided with a copolymer barrier coating as described in this Example. Curve A plots temperature T in degrees Celsius, Curve B plots barrier coating weight loss TG in weight percent, and Curve C plots differential scanning calorimeter output DSC in mW. The ability of these coatings to decompose without residues at moderate temperatures, together with their effectiveness in preventing microchannel washcoat intrusion, are important factors for the production of particulate filters exhibiting washcoated pressure drops less than twice those of uncoated filter samples at soot loadings to 5 g/liter and gas flow velocities to 150,000 hr–1.

EXAMPLE 3

Ethylene Acrylic Acid Wax Barrier Coating

Several aluminum titanate filter samples having composition and configuration of the filter samples processed in accordance with Example 1 above are selected for washcoating treatment, and a number of the samples are pretreated with an aqueous ethylene acrylic acid wax emulsion solution prior to washcoating. The wax emulsion selected to provide this barrier coating is Michem® Prime 4983R Dispersion, commercially available from Michelman, Inc., Cincinnati, Ohio, USA. This product is supplied as an aqueous polymer dispersion comprising about 25% by weight of dispersed ethylene acrylic acid wax of 30 nm average particle size and approximately 30,000 molecular weight. To facilitate coating, the as-supplied emulsion is diluted to 12% solids by weight, and 3% by weight of isopropyl alcohol is added to the diluted suspension to reduce surface tension of the resulting barrier coating solution.

While this solution is of a viscosity suitable for ambient dip-coating, a vacuum impregnation method involving immersing the filter samples in solutions and drawing a mild vacuum on the solutions, substantially as described in Example 1 above, is used to insure trapped air removal and thorough solution impregnation into the large pore structure of the ceramic. Following the application of this coating solution the samples are removed, blown free of excess solution, and then dried in air at 100° C. for 3 hours or until a constant weight is reached, thereby setting the coating within the pore structure of the ceramic.

The coating procedure described above produces barrier coating weights in the range of 1.5–3% of the weight of the uncoated samples. Lower coating weights can be achieved through the use of more dilute coating solutions, but this approach is not preferred because it often necessitates the use of multiple coating applications to achieve full substrate protection.

Following the application of these acrylic acid barrier coatings, both coated and uncoated filter samples are washcoated with AL20 colloidal alumina sol substantially as described in Example 1 above. The acrylic acid barrier coatings exhibit excellent compatibility with these alumina washcoating sols, as indicated by the fact that substantially equivalent washcoat pickups are observed to result for both the barrier-coated and uncoated filter samples. Table 1 below sets forth results for this series of coating evaluations for one uncoated filter sample and three filter samples provided with an acrylic acid barrier coating as above described. Included in Table 1 for each of the four sample filters are the weight of the barrier coating when present, expressed as a percentage of the barrier-coated filter weight, and the coating weights for the resulting alumina washcoats, in grams of alumina per liter of sample filter volume.

TABLE 1

Alumina Washcoated Aluminum Titanate Filters

| Coating Type | Sample No. | | | |
|---|---|---|---|---|
| | 1 (no barrier coat) | 2 | 3 | 4 |
| Barrier Coating Weight (%) | — | 1.3785 | 2.7194 | 2.0849 |
| Alumina Washcoat Loading (g/l) | 51.458 | 46.274 | 47.896 | 49.436 |

Thermal expansion evaluations of samples produced as above described are carried out in order to determine the effectiveness of the acrylic acid wax barrier coatings in preventing large thermal expansion increases in the filters upon application of colloidal alumina washcoats. Barrier-coated filter samples prepared and washcoated in accordance with this Example consistently exhibit average linear CTE values approximating $14 \times 10^{-7}/°$ C. (25–1000° C.) after washcoating. Accordingly, these wax barrier coatings were judged highly effective in preventing alumina intrusion into the fine microcrack and microchannel structure of aluminum titanate filters. In addition, during the normal washcoat heat treatment and/or catalyst activation steps of the described process, the wax barrier coatings are effectively entirely removed. That removal appears to result in the complete reopening of micropores present in the wall structures of these filters, so that the reductions in overall permeability resulting from the application of the washcoat preparation to the filter is minimized.

To quantify the performance of these wax barrier coatings in protecting filter permeability, soot-loaded filter pressure drop tests are conducted on both washcoat-free and alumina-washcoated aluminum titanate filter samples produced in accordance with the Example. Pressure drop results characteristic of such samples are illustrated in FIG. 4 of the drawings.

Figure 4:
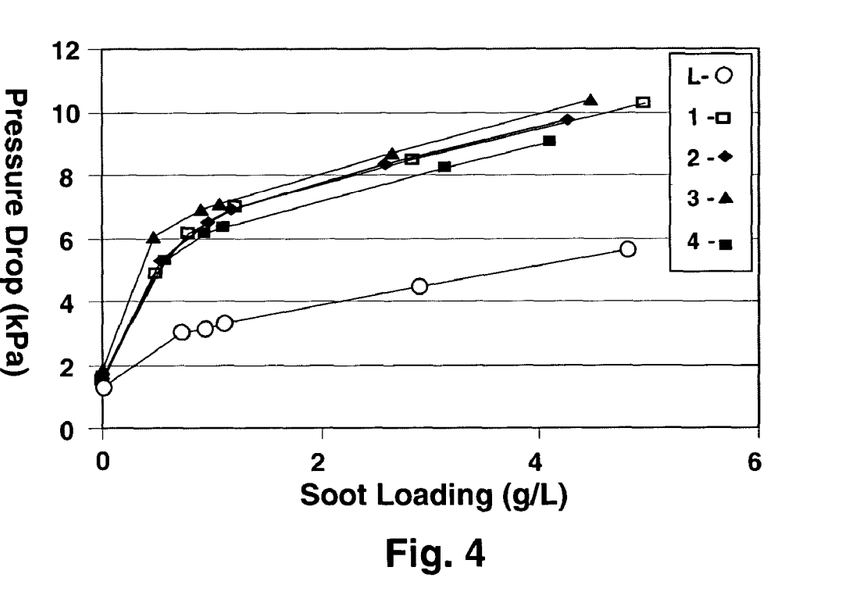
FIG. 4 plots pressure drop data for ceramic filter samples with and without applied washcoatings.

Included in FIG. 4 are pressure drop results for each of the washcoated Samples 1–4 reported above in Table 1, along the pressure drop exhibited by a control filter sample L of the same geometry, composition, and pore morphology as Samples 1–4. As the curves in FIG. 4 indicate, the results for all of the washcoated samples tested indicate that filter pressure drops at the maximum filter soot loading evaluated in no case exceeded twice the pressure drop of the uncoated control sample at an equivalent soot loading. In light of these data it is evident that ethylene-acrylic acid wax barrier coatings offer excellent protection against the excessive CTE increases that would otherwise result from the application of alumina washcoats. Further, due in part to the hydrophilic nature of the barrier coating, compatibility with aqueous washcoating formulations is sufficient to yield a uniform washcoating distribution that does unduly increase filter pressure drop.

Of course, the foregoing examples are merely illustrative of the invention as it may be practiced within the scope of the appended claims.

We claim:

1. A microporous or microcracked ceramic article consisting of a porous ceramic wall flow particulate filter substrate having an interconnected microporous wall structure supporting a polymer coating composed of a polymeric material selected from the group consisting of coating of ionene polymers, acid-activated aminoacrylate copolymers comprising a methacrylic backbone incorporating hydrophobic and hydrophilic components and an amino group, and aliphatic acrylic acid wax copolymers.

2. A microporous or microcracked ceramic article in accordance with claim 1 which is a ceramic wall-flow filter body wherein aluminum titanate comprises the principal crystalline phase in the ceramic.

3. A method for protecting a porous ceramic wall flow particulate filter substrate having a microporous or microcracked structure from microstructural infiltration by microparticles present in a washcoating medium which comprises the step of applying to a porous ceramic wall flow particulate filter substrate having an interconnected microporous wall structure a polymeric barrier layer composed of a hydrocarbon polymer with hydrophilic and hydrophobic functional groups that is soluble or dispersible in a polar medium, and that forms a neutral or hydrophilic surface on the substrate, said polymer barrier layer being composed of a polymer selected from the group consisting of ionene polymers, acid-activated aminoacrylate copolymers comprising a methacrylic backbone incorporating hydrophobic and hydrophilic components and an amino group, and aliphatic acrylic acid wax copolymers.

4. A method in accordance with claim 3 wherein the porous ceramic substrate is a ceramic honeycomb wherein aluminum titanate constitutes the principal crystalline phase.

5. A method for washcoating a porous ceramic wall flow particulate filter substrate with an aqueous dispersion selected from the group of catalysts, catalyst support materials and mixtures of catalysts and support materials which comprises the steps of:

precoating a porous ceramic wall flow particulate filter substrate having an interconnected microporous wall structure with a polymeric barrier layer selected from the group consisting of ionene polymers, acid-activated aminoacrylate copolymers comprising a methacrylic backbone incorporating hydrophobic and hydrophilic components and an amino group, and aliphatic acrylic acid wax copolymers to provide a polymer-coated substrate;

coating the polymer-coated substrate with the aqueous dispersion of catalysts and/or catalyst support materials to provide a coated substrate; and     heating the coated substrate to remove the polymeric material therefrom.

6. A method in accordance with claim 5 wherein the aqueous dispersion comprises a dispersion of alumina or alumina precursors.

7. A method in accordance with claim 6 wherein the aqueous dispersion has a pH in the range of 3–4.

* * * * *